Patented Apr. 13, 1948

2,439,728

UNITED STATES PATENT OFFICE 2,439,728

PYRIDINE CARBONYL AMIDES OF THE BENZENE SERIES

Peter F. Gross, Woodstown, N. J., assignor to E. I. du Pont de Nemours & Company, Wilmington, Del., a corporation of Delaware No Drawing. Original application August 30, 1941, Serial No. 409,002. Divided and this application January 17, 1942, Serial No. 427,179

1 Claim. (Cl. 260—295)

This invention relates to new compositions of matter and especially to pyridine carbonyl amides which contain an arylamine group of the benzene series. These compounds are especially suitable for use as amino bases for the manufacture of azo dyes.

When combined with ice color coupling components to produce azo compounds, the resulting dyes are represented by the general formula $C_5H_4N-CONH-Ph-N=N-A$, wherein $C_5H_4N-$ is the residue of pyridine, Ph is the residue of a phenylene group and A is the residue of an ice color coupling component which is devoid of solubilizing groups. The new pyridine carbonyl amides produce novel azo dyes in coupled combinations of the kind indicated. For example, such dyes wherein the coupling component is an arylide of beta hydroxy naphthoic acid which is devoid of water solubilizing groups are novel blue azo dyes. They have more satisfactory light fastness, resistance to chlorine and dischargeability than dyes of similar structure which contain furoyl- or thenoyl- groups instead of pyridine carbonyl groups. Similar and other improvements are noted in other dyes which comprise these diazo components and other water insoluble coupling components.

It is among the objects of this invention to provide new pyridine carbonyl amides which are represented in general by the formula

wherein $C_5H_4N-$ is a pyridine residue and Ph is the residue of a phenylene group which is devoid of water solubilizing groups such as carboxyl and sulfonic acid but which may be substituted by other groups. In this formula the group

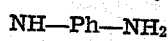

may be derived by appropriate means from a phenylene diamine which is devoid of free carboxy and sulfonic acid groups, but which can be substituted by other groups that do not produce water solubility. It may also be derived from similar types of nitro-anilines. Another object of the invention is to provide novel amino bases which are capable of producing improved dyes in shades of blue when coupled with suitable coupling components. Still other objects of the invention will be apparent from the following description.

The objects of the invention may be attained conveniently by reacting a picolinic, nicotinic or iso-nicotinic acid with a 3-nitro- or 4-nitro-aniline to produce a nitro pyridine carbonyl amino compound. The nitro group of this compound is then reduced to amino by appropriate means.

The invention will be more fully set forth in the following more detailed description which includes examples that are given as illustrative embodiments of the invention and not as limitations thereof. Parts are expressed in parts by weight unless otherwise noted.

EXAMPLE 1

(a) Preparation of 4-picolinylamino-2,5-diethoxy-nitro-benzene

A mixture of 123 parts picolinic acid, 113 parts of 4-nitro-2,5-diethoxy-aniline, 121 parts dimethyl-aniline and 1200 parts toluene was heated to 80° C. Then 55 parts of phosphorus-tri-chloride was added over a period of 20–30 minutes. The temperature was held at 80°–90° C. for one hour and was then raised to the boiling point of the mixture where it was held for 12 hours longer. When the reaction was completed, steam was blown into the mixture until all steam-volatile material had been distilled off. The residue was filtered and the solid product was washed thoroughly with hot water and dried. There was obtained 114 parts of crude product. The crude product was purified by recrystallization from the ethyl ether of ethylene glycol, yielding 4-picolinylamino-2,5-diethoxy-nitro-benzene which was a bright yellow crystalline material melting at 172° C.

(b) Preparation of 4-picolinylamino-2,5-diethoxy-aniline

A mixture of 122 parts of 4-picolinylamino-2,5-diethoxy-nitro-benzene, 6 parts reduced nickel catalyst, and 375 parts toluene was placed in a closed autoclave and heated at 100° C. under a pressure of hydrogen at 400–500 pounds gauge. When absorption of hydrogen was completed, the hot solution was filtered to remove the catalyst and a yield of 70 parts of product crystallized out as a dark yellow solid upon cooling the filtrate. This was filtered off and dried. An additional 30 parts of product was then recovered from the filtrate by extraction with dilute acid and precipitating with ammonia. After purification by recrystallizing from the ethyl ether of ethylene glycol, the crystalline product of 4-picolinylamino-2,5-diethoxy-aniline was a yellow crystalline material melting at 113° C. It is represented by the formula

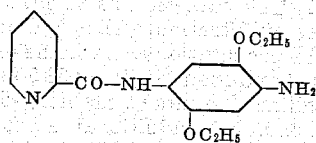

EXAMPLE 2

Preparation of 4-picolinylamino-2,5-dimethoxy aniline

A mixture of 72.5 parts of sodium picolinate, 85 parts of 2,5-dimethoxy-aniline and 400 parts of toluene was treated with 34 parts of phosphorus tri-chloride. The temperature was raised to the boiling point and the mixture refluxed for 3 hours. The toluene was removed by steam distillation. The residue was cooled, the condensation product was separated from the water and dissolved in 300 parts of toluene. The toluene solution was added slowly to 420 parts of 15% nitric acid. The mixture was held at 50°–60° C. with good agitation during the addition and it was then heated to and held at 75° C. for 15 to 20 minutes. The toluene was then removed by distillation and the solid product was filtered off, washed with methyl alcohol and dried, giving 136 parts of the nitro compound.

The nitro compound was placed in an autoclave together with 600 parts of toluene, 3 parts of calcium carbonate and 13 parts of reduced nickel catalyst. The mixture was heated at 100° C. and under a pressure of hydrogen of 400–500 pounds gauge until hydrogenation was completed. The catalyst was removed by filtering the hot mixture and the toluene solution was concentrated at atmospheric pressure to a volume of 200–400 parts. The crystalline product of 4-picolinylamino-2,5-dimethoxy-aniline was filtered off, washed with methyl alcohol and dried, yielding 106 parts of the product.

EXAMPLE 3

(a) Preparation of 2-nitro-4-methoxy-5-picolinylamino-toluene

A mixture of 72.5 parts of sodium picolinate, 75 parts of cresidine, 400 parts toluene and 34 parts phosphorus tri-chloride was refluxed for 3 hours. The toluene was removed by steam distillation and the residue was filtered and dried, giving 125 parts of condensation product. This was dissolved in 300 parts of toluene and the solution was filtered from a small amount of insoluble impurity. The solution was then run slowly into 420 parts of 15% nitric acid. Vigorous agitation was maintained, and the temperature was held at the boiling point of the mixture (80°–85° C.) during the addition and then for 45 minutes more. Thereafter the toluene was removed by steam distillation but the material appeared not to be completely nitrated. The material was separated from the water layer, and redissolved in 300 parts toluene. This solution was run as before at the boil into 310 parts of 20% nitric acid. The mixture was cooled, filtered and dried, yielding 58 parts of 2-nitro-4-methoxy-5-picolinylamino toluene which was a crystalline product.

(b) Preparation of 2-amino-4-methoxy-5-picolinylamino-toluene

A mixture of 58 parts of 2-nitro-4-methoxy-5-picolinylamino-toluene, 6 parts reduced nickel catalyst, 2 parts of calcium carbonate and 600 parts of toluene was placed in an autoclave and heated at 100° C. under a pressure of hydrogen of 400–500 pounds gauge until hydrogenation was completed. The catalyst was removed from the hot mixture by filtration. The solution was concentrated by evaporation to a volume of about 100 parts, cooled and filtered, giving 38.5 parts of yellow crystalline 2-amino-4-methoxy-5-picolinyl-amino-toluene. An additional amount of less pure material was recovered from the filtrate by extraction with hydrochloric acid.

EXAMPLE 4

(a) Preparation of 4-nicotinylamino-2,5-diethoxy-nitrobenzene

A mixture of 45.2 parts of 4-nitro-2,5-diethoxy-aniline, 42 parts nicotinyl chloride, and 80 parts pyridine was heated at 95°–100° C. for 2 hours and then poured into 600 parts of cold water. After standing overnight, the crystalline product, a bright yellow material, was filtered and washed with water until the odor of pyridine could no longer be detected, and then dried. A yield of 64 parts of 4-nicotinylamino-2,5-diethoxy-nitro-benzene having a melting point of 127° C. was obtained.

(b) Preparation of 4-nicotinylamino-2,5-diethoxy-aniline

A mixture of 16.6 parts of 4-nicotinylamino-2,5-diethoxy-nitro-benzene, 150 parts methyl alcohol and 5 parts of reduced nickel catalyst was placed in a closed autoclave and heated at 100° C. under a pressure of hydrogen of 400–500 pounds gauge. After the absorption of hydrogen was completed, the mixture was removed from the autoclave and filtered while still hot. The filtrate was evaporated to yield the light-colored crystalline product consisting of 4-nicotinylamino-2,5-diethoxy-aniline. The product is represented by the formula

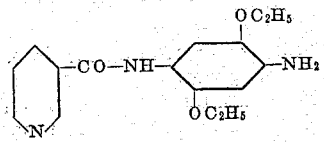

EXAMPLE 5

(a) Preparation of 4-iso-nicotinylamino-2,5-diethoxy-nitro-benzene

A mixture of 15 parts of 4-nitro-2,5-diethoxy-aniline, 14 parts iso-nicotinyl-chloride and 30 parts pyridine was heated for 5 hours at 95° C. to 100° C. under reflux. The reaction mixture was poured into 300 parts water and the solid product was filtered, washed free from pyridine with water, and dried. A yield of 21.5 parts of crude 4-iso-nicotinyl-amino-2,5-diethoxy-nitro-benzene was obtained. This was freed from contamination with unreacted 4-nitro-2,5-diethoxy-aniline by treatment with nitrous acid sufficient completely to diazotize the unreacted amino body, filtering and washing free from diazo and from acid.

The product is represented by the formula

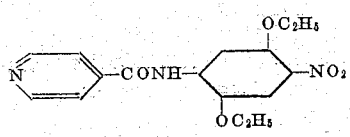

(b) Preparation of 4-iso-nicotinyl-amino-2,5-diethoxy-aniline

A mixture of 10 parts of 4-iso-nicotinyl-amino-2,5-diethoxy-nitro-benzene, 100 parts of methyl alcohol and 2 parts of reduced nickel catalyst was placed in a closed autoclave and heated at 100° C. under a pressure of hydrogen of 400–500 pounds gauge. After the absorption of hydrogen was complete, the mixture was filtered hot to remove spent catalyst. The filtrate was evaporated to yield the crystalline 4-iso-nicotinylamino-2,5-diethoxy-aniline.

EXAMPLE 6

(a) Preparation of 3-picolinylamino-nitro-benzene

A mixture of 75 parts sodium picolinate, 69 parts m-nitroaniline and 1000 parts toluene was heated to 70° C. Then 34.2 parts of phosphorus tri-chloride was added over a period of 10 to 15 minutes, and the temperature was raised to the boiling point and held there for 8 hours. The toluene was then removed by steam distillation and the crude product was filtered off from the residue. This product still contained unreacted m-nitraniline, which was removed by treatment of an aqueous slurry of the material with hydrochloric acid and sodium nitrite, filtering, and washing free from acid and diazotized m-nitraniline. The dried product consisted of 75 parts of 3-picolinylamino-nitro-benzene having a melting point of 167° C.

(b) Preparation of 3-picolinylamino-aniline

A mixture of 60.8 parts of 3-picolinylamino-nitrobenzene, 300 parts of methyl alcohol and 6 parts of reduced nickel catalyst was placed in an autoclave and heated at 100° C. under a pressure of hydrogen of 400–500 pounds gauge until the absorption of hydrogen was completed. The charge was then removed from the autoclave and filtered hot to remove the catalyst. The filtrate was evaporated to dryness, giving a yield of 49 parts of 3-picolinylamino-aniline containing 19.7% nitrogen. The theoretical content of nitrogen in 3-picolinylamino-aniline is 19.72%.

EXAMPLE 7

(a) Preparation of 4-picolinylamino-3-chloro-nitrobenzene

A mixture of 75 parts of sodium picolinate, 89 parts of 2-chloro-4-nitro-aniline and 1000 parts toluene was heated to 70° C. and 34.2 parts of phosphorus tri-chloride was added over a period of 10–15 minutes. The mixture was then heated to the boiling point. After refluxing for 8 hours, the toluene was removed by distillation with steam. The residue was cooled and filtered, and the crude product was dried and recrystallized from the ethyl ether of ethylene glycol, washed thoroughly and dried. The purified product consisted of 70 parts of 4-picolinylamino-3-chloronitro-benzene having a melting point of 236° C.

(b) Preparation of 4-picolinylamino-3-chloro-aniline

A mixture of 55.4 parts of 4-picolinylamino-3-chloro-nitrobenzene, 350 parts of methyl alcohol and 5 parts reduced nickel catalyst was heated in an autoclave at 100° C. under a pressure of hydrogen of 400–500 pounds pressure until the hydrogenation was completed. The charge was filtered hot to remove the catalyst and the filtrate was evaporated to dryness, giving 36.5 parts of 4-picolinylamino-3-chloroaniline analyzing 16.63% nitrogen and 14.63% chlorine. The theoretical content of nitrogen and chlorine in this product is 16.97% nitrogen and 14.34% chlorine.

EXAMPLE 8

(a) Preparation of 2-picolinylamino-4-nitro-toluene

A mixture of 75 parts of sodium picolinate, 63 parts of 4-nitro-2-amino-toluene and 1000 parts toluene was warmed to 70° C. and 28 parts phosphorus tri-chloride was added to the mixture over a period of 10–15 minutes. After the mixture had been heated to the boiling point and refluxed for 8 hours, the toluene was distilled out with steam and the residue was cooled, filtered off and dried, giving 89 parts of crude product. This product was purified by recrystallizing from toluene. The purified product consisting of 2-picolinyl-amino-4-nitro-toluene melted at 182° C.

(b) Preparation of 2-picolinylamino-4-amino-toluene

A mixture of 46.3 parts of 2-picolinyl-amino-4-nitro-toluene, 4 parts nickel catalyst and 200 parts methyl alcohol was hydrogenated in a closed autoclave at 100° C. under a pressure of hydrogen of 400–500 pounds gauge until the nitro was reduced to amino. The catalyst was removed by filtering the hot solution and the filtrate was evaporated to a volume of about 60 parts, cooled, and filtered. The crystalline product consisting of 2-picolinylamino-4-amino-toluene weighed 33.5 parts when dry. Its melting point was 145° C. and it contained 18.25% nitrogen. The theoretical content of nitrogen in $C_{13}H_{13}ON_3$ is 18.51%.

EXAMPLE 9

(a) Preparation of 2-picolinylamino-5-nitro-anisole

A mixture of 75 parts of sodium picolinate, 84 parts 5-nitro-2-amino-anisole and 1000 parts toluene was warmed to 70° C. and 34.2 parts of phosphorus tri-chloride was added over a period of 10 to 15 minutes. After heating the mixture to boiling and refluxing for 8 hours, the toluene was distilled out with steam and the residue was cooled, filtered and dried, yielding 105 parts of crude product. The crude product was purified by recrystallization successively from the ethyl ether of ethylene glycol, toluene, and ethyl alcohol. The purified product consisting of 2-picolinylamino-5-nitro-anisole melted at 209° C. and contained 15.00% nitrogen, 56.81% carbon and 4.35% hydrogen. The theoretical content of nitrogen, carbon and hydrogen in $C_{13}H_{11}O_4N_3$ is 15.38% N, 57.14% C, and 4.07% H.

(b) Preparation of 2-picolinylamino-5-amino-anisole

A mixture of 20 parts of 2-picolinylamino-5-nitro-anisole, 2 parts reduced nickel catalyst and 200 parts methyl alcohol was placed in a closed autoclave and heated at 100° under a pressure of hydrogen of 500–600 pounds gauge. The catalyst was removed by filtering the hot solution. The filtrate was evaporated to a volume of about 60 parts and cooled. A crystalline product consisting of 8 parts of 2-picolinylamino-5-amino-anisole and melting at 134° C. was filtered off and dried. An additional quantity of less pure material was recovered from the filtrate.

EXAMPLE 10

A piece of cotton goods, impregnated in the usual manner with a solution of N-(2'-hydroxy-3'-naphthoyl)-aniline, was dried and a dye was developed thereon by applying a diazo bath which was prepared as follows:

One hundred parts of 4-picolinylamino-2,5-diethoxy aniline was stirred into 300 parts of water at 115° F. Then 97 parts of hydrochloric acid (32° Tw.) was added and mixed in thoroughly. Water and ice sufficient to bring the volume to 4000 parts and the temperature to 50° F. were added, followed by a solution containing 23.2 parts of sodium nitrite added over a period of 5 to 10 minutes. The diazo solution was allowed to stand for 30 minutes at 50–55° F., diluted to a volume of 30,000 parts and then buffered by adding 346 parts of sodium acetate.

When the development of the color was complete, the piece was rinsed, soaped at the boil, rinsed again and dried. A bright blue dyeing, having very good fastness to light, washing, chlorine and power laundry was obtained.

The dye is represented by the formula

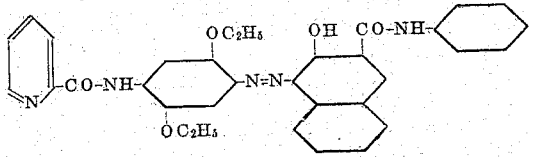

The fastness of the dyeing both to light and to chlorine was superior to that of the dyeing made by coupling diazotized 4-furoylamino-2,5-diethoxy-aniline with N-(2'-hydroxy-3'-naphthoyl)-aniline on cotton and its fastness to chlorine was very much superior to that of the dyeing made by coupling 4-alpha-thenoyl-amino-2,5-diethoxy-aniline with N-(2'-hydroxy-3'-naphthoyl)-aniline on cotton.

Similar blue dyeings having the superior properties of the dyeing of Example 10 are made in similar manner by using 4-iso-nicotinylamino-2,5-diethoxy-aniline in the procedure of Example 10 instead of 4-picolinylamino-2,5-diethoxy-aniline. N-(2'-hydroxy-3'-naphthoyl)-o-toluidine, the corresponding 3-nitro-aniline, the corresponding 1-amino-naphthalene and the corresponding p-amino-anisole when used in such combinations as the coupling components of the described dyes gave dyeings which had superior properties as compared with similar furoyl and thenoyl containing compounds.

The compounds of the present invention are represented in general by the formula

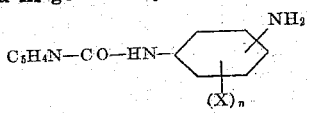

wherein X is from a group consisting of hydrogen, alkyl having 1 to 3 carbons, the corresponding alkoxy groups, phenyl, phenoxy, chloro and bromo; n is not greater than 2 and the group $C_5H_4N$—CO— is the residue of a 2-, 3- or 4- pyridine carboxylic acid.

As illustrative of other primary arylamines of the pyridine-carbonyl-amino compounds of the benzene series which can be used as amino bases to produce azo combinations having properties similar to those described are mentioned 3-bromo-4-picolinylamino-aniline, 3-nitro-4-picolinylamino-aniline, 5-amino-2-picolinylamino-diphenylether, 4-picolinylamino-2,5-di-n-propoxy-aniline, 4-amino-6-picolinylamino-1,3-xylene, 2-amino-5-picolinylamino-4-iso-propyl-toluene and 2-amino-4-chloro-5-picolinylamino-toluene.

By the methods described any 2-, 3- or 4-pyridine carboxylic acid can be used in the manner indicated in the foregoing examples and reacted with any 3-nitro or 4-nitro-aniline of the kinds described to produce the pyridine-carbonyl-amino compounds represented by the foregoing formula.

As illustrative of the many nitro-anilines in addition to those shown in the foregoing examples which can be reacted with picolinic, nicotinic or iso-nicotinic acid to produce such nitro-pyridine-carbonyl-amino compounds of the benzene series are mentioned 2-nitro-4-amino-5-chloro-toluene, 3-bromo-4-nitroaniline, 2-amino-5-nitro-diphenylether, 4-nitro-2,5-diiso-propoxy aniline, 2-nitro-4-amino-5-n-propoxy toluene, 2-nitro-4-amino-ethylbenzene, 2-amino-5-nitro-1,4-xylene, 2-amino-4-isopropyl-5-nitro-anisole, 2-chloro-3-nitro-6-amino toluene. Any of the resulting nitro-pyridine-carbonyl-amino compounds of the benzene series may be readily reduced to the analogous primary amines by suitable reduction methods, such as those described in the foregoing examples. In the reductions with nickel catalyst, any nickel hydrogenation catalyst can be used. The temperature and pressure of hydrogenation may be considerably varied. Temperatures of about 50° to about 200° C. and pressures of about 200 to about 1000 pounds gauge are suitable. More or less inert solvent can be used besides the proportions enumerated and any inert solvent besides toluene or methyl alcohol can be used. By inert organic solvent is meant any organic solvent in which the nitro substituted compound to be treated is soluble to an appreciable extent, which does not hydrogenate in the conditions used to reduce the nitro group and which does not react with the final product except as a solvent. Calcium carbonate is not an essential constituent of the reduction medium.

The preferred class of arylamines are pyridine-carbonyl-amides of the formula

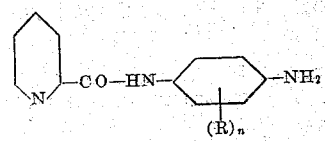

and especially those wherein R is from the group consisting of hydrogen, methyl, methoxy, ethoxy and chloro. The dyes made by diazotizing the amides of this class and coupling with an arylide of 2,3-hydroxy-naphthoic acid have the best general properties together with the improvement in dischargeability, chlorine fastness and light fastness.

This is a division of my copending application Serial No. 409,002, filed August 30, 1941, now Patent No. 2,365,265.

From the foregoing disclosure it will be recognized that the invention is susceptible of modification without departing from the spirit and scope thereof and it is to be understood that the invention is not restricted to the specific illustrations thereof herein set forth.

I claim:

The compound represented by the formula

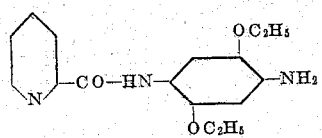

PETER F. GROSS.

REFERENCES CITED

The following references are of record in the file of this patent:

UNITED STATES PATENTS

| Number | Name | Date |
| --- | --- | --- |
| 2,186,769 | Schirm | Jan. 9, 1940 |